US 6,633,862 B2
Oct. 14, 2003

(12) United States Patent
Thompson

(54) SYSTEM AND METHOD FOR DATABASE CACHE SYNCHRONIZATION ACROSS MULTIPLE INTERPRETED CODE ENGINES

(75) Inventor: Blake A. Thompson, Lehi, UT (US)

(73) Assignee: Intel Corporation, Santa Clara, CA (US)

( * ) Notice: Subject to any disclaimer, the term of this patent is extended or adjusted under 35 U.S.C. 154(b) by 214 days.

(21) Appl. No.: 09/751,052

(22) Filed: Dec. 29, 2000

(65) Prior Publication Data

US 2002/0087504 A1 Jul. 4, 2002

(51) Int. Cl.$^7$ .............................................. G06F 17/30
(52) U.S. Cl. ........................................ 707/1; 707/200
(58) Field of Search ........................ 707/1, 100, 103 R, 707/103 Y

(56) References Cited

U.S. PATENT DOCUMENTS

| | | | | | |
|---|---|---|---|---|---|
| 4,523,206 A | * | 6/1985 | Sasscer | ...................... | 711/130 |
| 4,530,054 A | * | 7/1985 | Hamstra et al. | ............. | 711/133 |
| 4,714,992 A | * | 12/1987 | Gladney et al. | ............. | 707/206 |
| 4,823,310 A | * | 4/1989 | Grand | ............................ | 707/8 |
| 5,293,627 A | * | 3/1994 | Kato et al. | ................... | 713/503 |
| 5,651,113 A | * | 7/1997 | Lin et al. | ....................... | 714/56 |
| 5,701,480 A | * | 12/1997 | Raz | ............................. | 709/101 |
| 5,799,322 A | * | 8/1998 | Mosher, Jr. | .................. | 707/202 |
| 5,799,323 A | * | 8/1998 | Mosher et al. | .............. | 707/202 |
| 5,881,229 A | * | 3/1999 | Singh et al. | ................. | 709/203 |
| 5,897,634 A | * | 4/1999 | Attaluri et al. | ................. | 707/8 |
| 5,924,096 A | * | 7/1999 | Draper et al. | ................. | 707/10 |
| 5,987,506 A | * | 11/1999 | Carter et al. | ................. | 709/213 |
| 6,170,063 B1 | * | 1/2001 | Golding | ...................... | 713/502 |
| 6,209,090 B1 | * | 3/2001 | Aisenberg et al. | ........... | 713/178 |
| 6,247,149 B1 | * | 6/2001 | Falls et al. | ...................... | 714/45 |
| 6,285,997 B1 | * | 9/2001 | Carey et al. | ..................... | 707/4 |
| 6,295,541 B1 | * | 9/2001 | Bodnar et al. | ............... | 707/203 |
| 6,327,574 B1 | * | 12/2001 | Kramer et al. | ................. | 705/14 |
| 6,418,455 B1 | * | 7/2002 | Horowitz et al. | ........... | 707/202 |
| 6,449,291 B1 | * | 9/2002 | Burns et al. | ................. | 370/516 |
| 6,539,340 B1 | * | 3/2003 | Robins et al. | .............. | 702/186 |

FOREIGN PATENT DOCUMENTS

WO    PCT/GB96/02977    *  6/1997

OTHER PUBLICATIONS

IBM Technical Disclosure Bulletin "Solving Time of Day problems when using DB2 Timstamp in Optimistic Lock Implementation", Jul. 1992, vol. 35, No. 2, p. 420–422.*
IBM Technical Disclosure Bulletin "Shawdow Page Mechanism", Jun. 1986, vol. 29, No. 1, p. 340–342.*
IBM Technical Disclosure Bulletin "Copying Large Data Objects With Directory Attributes", May 1993, vol. 36, No. 5, p. 65–68.*

* cited by examiner

Primary Examiner—Safet Metjahic
Assistant Examiner—Hanh B Thai
(74) Attorney, Agent, or Firm—Blakely, Sokoloff, Taylor & Zafman LLP

(57) ABSTRACT

A method for synchronizing data sharing across multiple interpreted code engines is described. The method includes comparing a database timestamp with a first cache timestamp responsive to an attempt to access the first cache. Then, the method disallows access to the first cache if the database timestamp is not equal to the first cache timestamp. Finally, the method reloads the first cache with data from the database; and sets the first cache timestamp to equal the database timestamp.

35 Claims, 8 Drawing Sheets

SYSTEM AND METHOD FOR DATABASE CACHE SYNCHRONIZATION ACROSS MULTIPLE INTERPRETED CODE ENGINES

BACKGROUND

1. Field of the Invention

This invention relates generally to the field of computer programming. More particularly, the invention relates to a system and method for synchronizing data sharing across multiple interpreted code engines (e.g., Java virtual machines) and/or applications.

2. Description of the Related Art

Java is an object-oriented programming language used to create computer programs which are platform-independent. That is, the same Java object code may be used on numerous different operating systems including Windows 95, Unix, Solaris, and Macintosh; and processors such as Intel® Pentium®-class processors, MIPS processors and AMD Athlon® processors, to name a few. This interoperability makes Java an ideal choice for programming Internet applications.

Once a program is written in Java source code, the Java compiler generates object code in the form of a Java application or applet. Technically, an "applet" is an application configured specifically to run within a Web browser such as Internet Explorer® or Netscape Navigator® (e.g., embedded in-line as objects within Hypertext Markup Language ("HTML") documents). As illustrated in FIG. 1, Java applets and applications 100 are executed by a runtime interpreter residing on the client computer 130 commonly referred to as a Java "virtual machine" 110. The Java virtual machine 110 interprets the platform-independent program code from the application or applet 100 into code which the native client microprocessor 120 can execute (e.g., x86 instructions in the case of a Pentium®-class processor).

More than one virtual machine and/or Java application/applet may be concurrently executed on a client. One limitation of prior systems, however, is that no built in mechanism exists for sharing data between two or more virtual machines and/or Java applications. Accordingly, what is needed is a system and method for sharing data between multiple virtual machines and/or applications. What is also needed is a system and method for caching data and maintaining data coherency when data is shared between virtual machines and/or applications.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Figure 1:
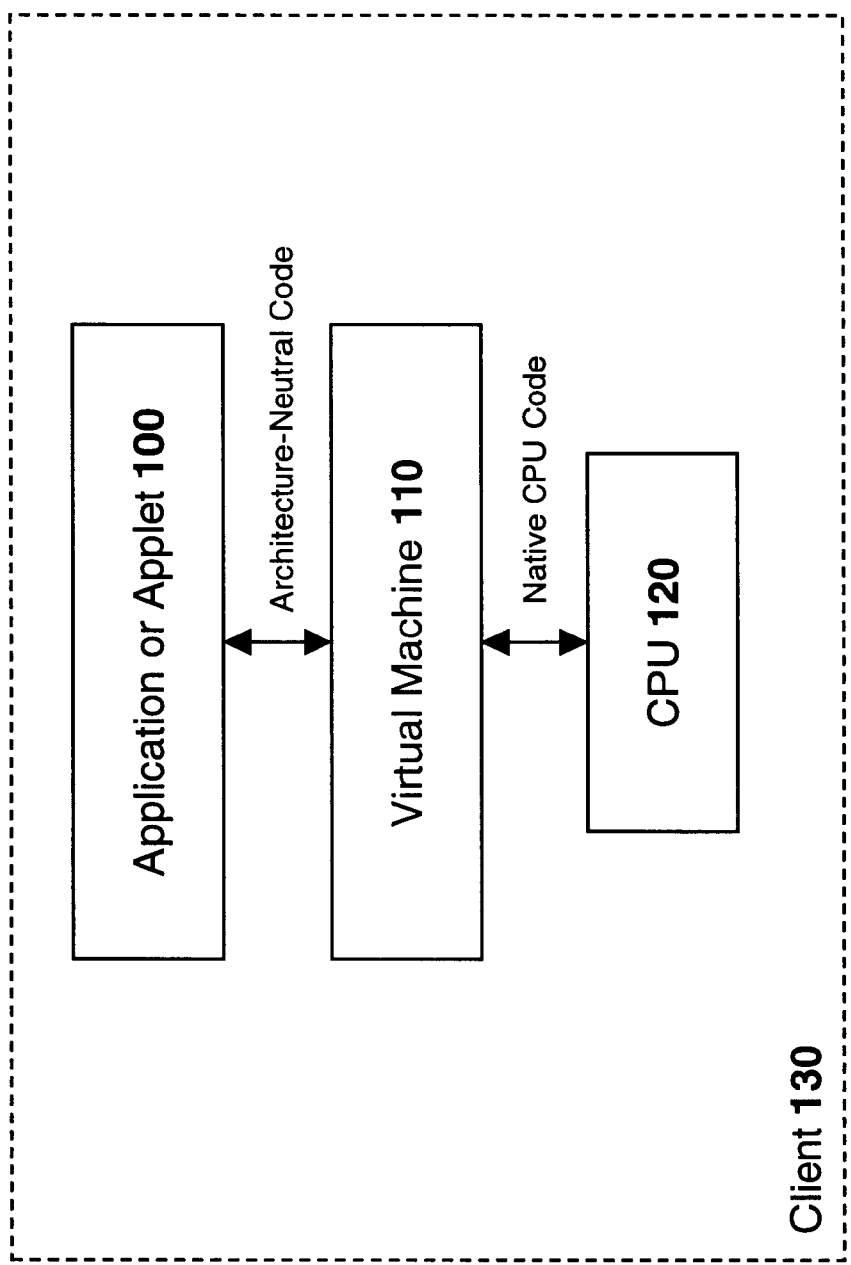
FIG. 1 illustrates a prior art Java virtual machine for interpreting code during runtime.
Figure 2:
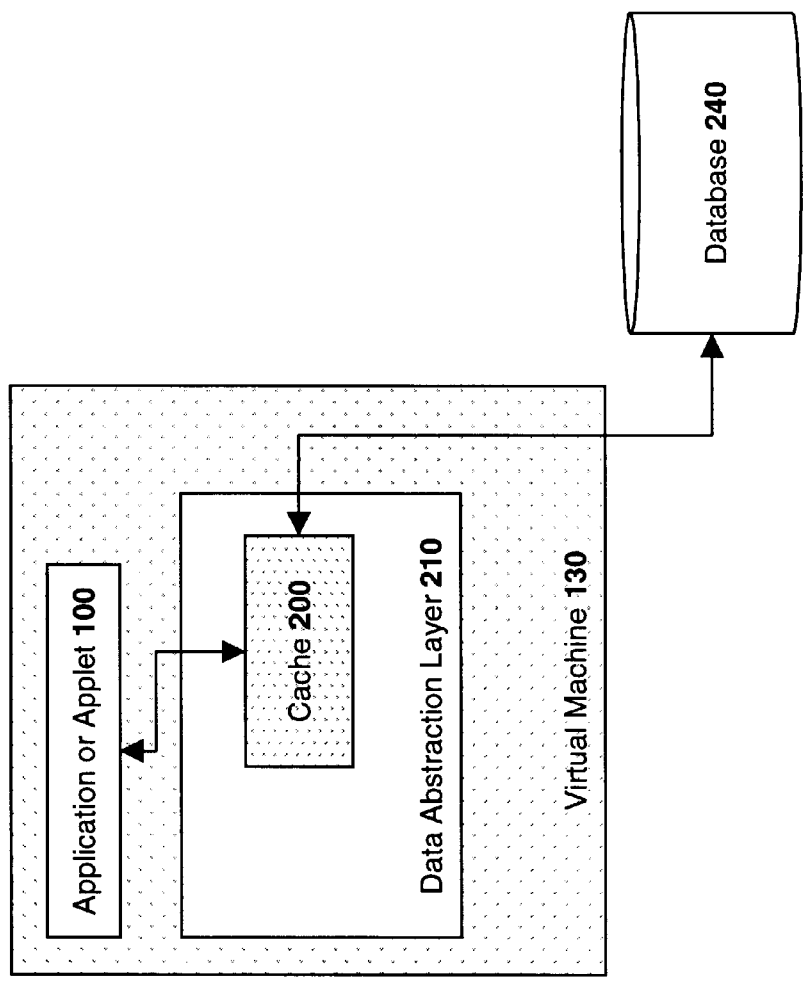
FIG. 2 illustrates one embodiment of a caching system implemented within a Java virtual machine.

As illustrated in FIG. 2, one embodiment of the invention is comprised of a data interface module, referred to herein as a data abstraction layer or "DAL" 210, which allows the Java virtual machine 130 to communicate with and store data (e.g., object-oriented data) within a relational database 240. For example, the DAL 210 may include routines (e.g., method calls) which are invoked by the virtual machine 130 to store data, run database queries and retrieve data from the database 240. Moreover, as described in greater detail below, other virtual machines and applications may concurrently access the database 240 via the data abstraction layer 240 (see FIGS. 3–4 and 6–7).

In one embodiment, the data abstraction layer 210 includes a cache 200 to store data, thereby providing applications/applets 100 with faster access to the data and reducing strain on the database 240 (e.g., by reducing the number of database reads/writes). In one embodiment, the cache 200 stores the most frequently requested data. However, various other caching techniques and/or algorithms may be employed while still complying with the underlying principles of the invention (e.g., a least-recently used cache replacement policy may be implemented for replacing the contents of the cache). Moreover, variables such as the size of the requested data and whether the data is marked as non-cacheable may also be factored into the caching determination.

Moreover, various types of data may be stored in the cache 200. For example, in one embodiment, the cache 200 is used to store metadata which describes the database's 240's structure, attributes, processing or database changes (e.g., the metadata may comprise an index of data stored in the database). It should be noted, however, that various other types of database data may be stored in the cache 200 consistent with the underlying principles of the invention.

Figure 3:
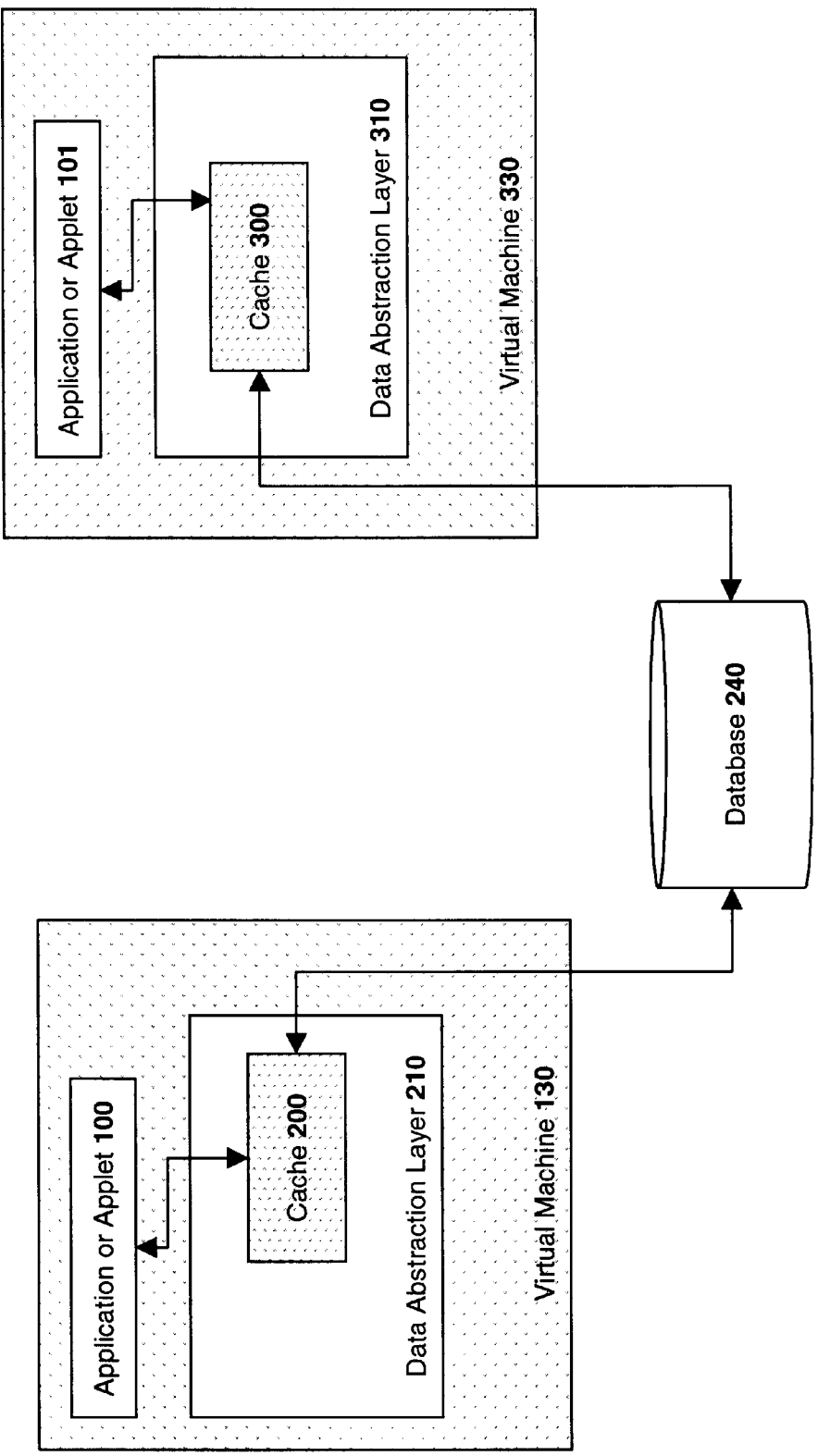
FIG. 3 illustrates two virtual machines caching data from the same database.

As mentioned briefly above, in one embodiment illustrated in FIG. 3, two or more virtual machines 130, 330 and/or Java applications 100, 101 may concurrently access the database 240. Java virtual machines 130, 330 typically separate each application's memory space from all other applications. Accordingly, when two applications 100, 101 use the data abstraction layer 210, 310 as illustrated in FIG. 3, two separate and distinct instances of the cache 200, 300 may concurrently store and modify the same data. As a result, it is necessary to take steps to ensure that the data stored in the caches 200, 300 remains synchronized.

Figure 4:
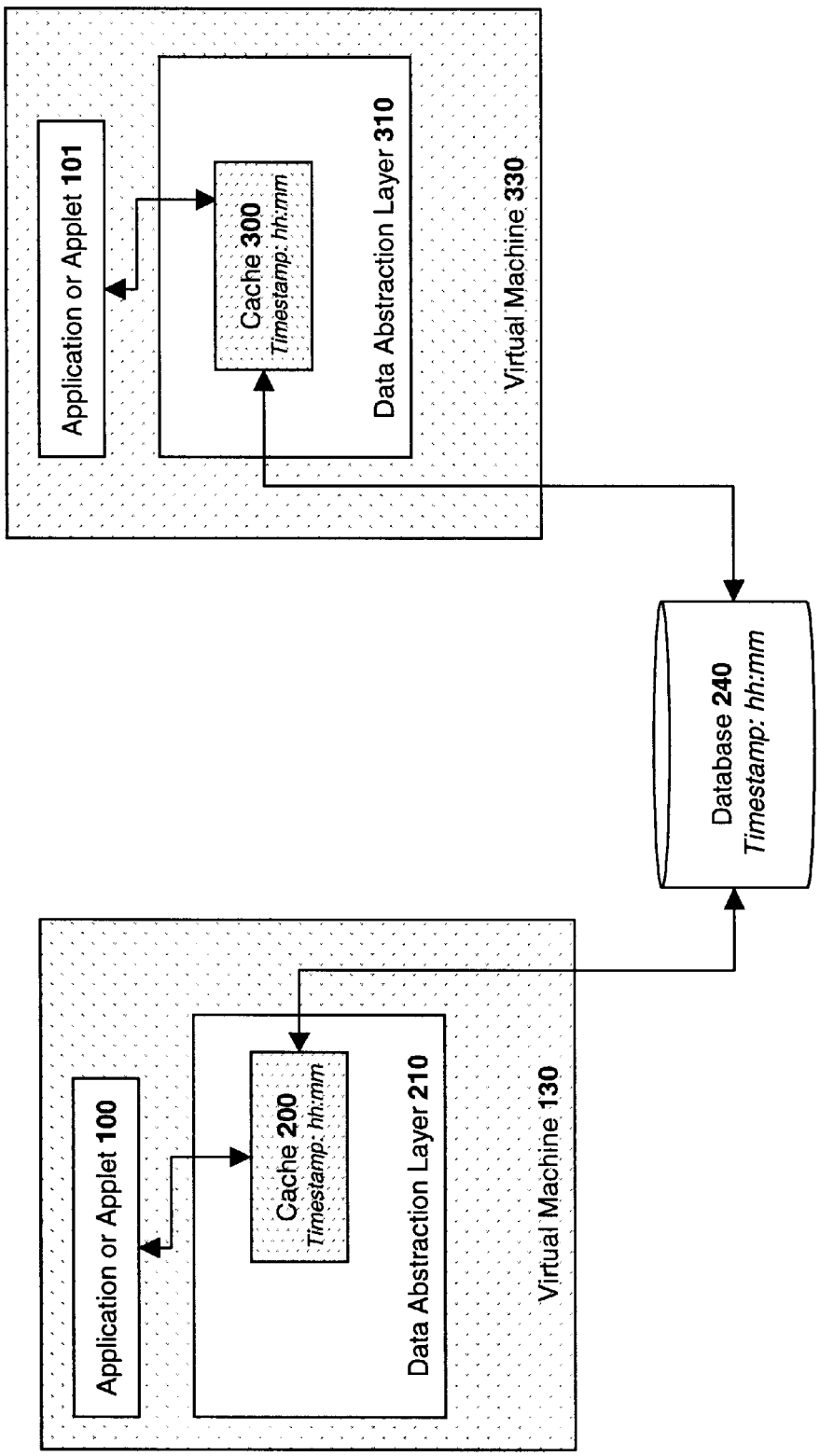
FIG. 4 illustrates one embodiment of the invention for maintaining cache coherency using timestamps.

In order to do so, in one embodiment of the invention, illustrated in FIG. 4, a "current timestamp" variable is updated in the caches 200, 300, indicating when the data was loaded into each cache or when the data was last modified. In addition, a current timestamp variable is associated with the database 240, indicating the time that data in either of the caches 200, 300 was modified. In operation, if an application 100 modifies its cache 200 it also modifies the database 140 data and updates the timestamp in the database 240 to indicate that the data was modified. When another application 101 invokes its own cache 300 (e.g., calls a method of the cache 300 object), it performs a lookup of the database 240 timestamp and compares its own timestamp with the database 240 timestamp. If the database 240 timestamp is newer, it then reloads it's own cache 300 from the database 240.

In one embodiment, reloading the cache 300 is accomplished in the following manner. First, the application 101 and/or the virtual machine 330 disallows access to the cache 300. In one embodiment, this is accomplished simply by toggling a Boolean variable (e.g., 1=cache access denied, 0=cache access permitted). However, various other techniques may be employed to deny access to the cache 300 while still complying with the underlying principles of the invention. In addition, the application 101 and/or the virtual machine 330 waits until all functions/methods which called into the cache 300 prior to detection of the cache reload requirement to finish processing. In one embodiment of the invention, this is accomplished via an access count variable that is incremented when each method of the cache 300 is called, and decremented when each method of the cache 300 completes (e.g., when the access count variable is zero, all method have completed). However, various other techniques may be employed to determine when all cache methods have terminated consistent with the underlying principles of the invention.

Once it is determined that the access count variable is zero (e.g., once the cache object determines that all functions called prior to dirty cache detection have completed) the cache is reloaded. In one embodiment, the entire contents of the cache are dumped and a fresh set of data are reloaded from the database. The timestamp associated with the cache 300 is then set to be the same as the database 140 timestamp. In this manner, cached data will remain consistent across multiple applications 100, 101 and/or virtual machines 130, 330.

Figure 5:
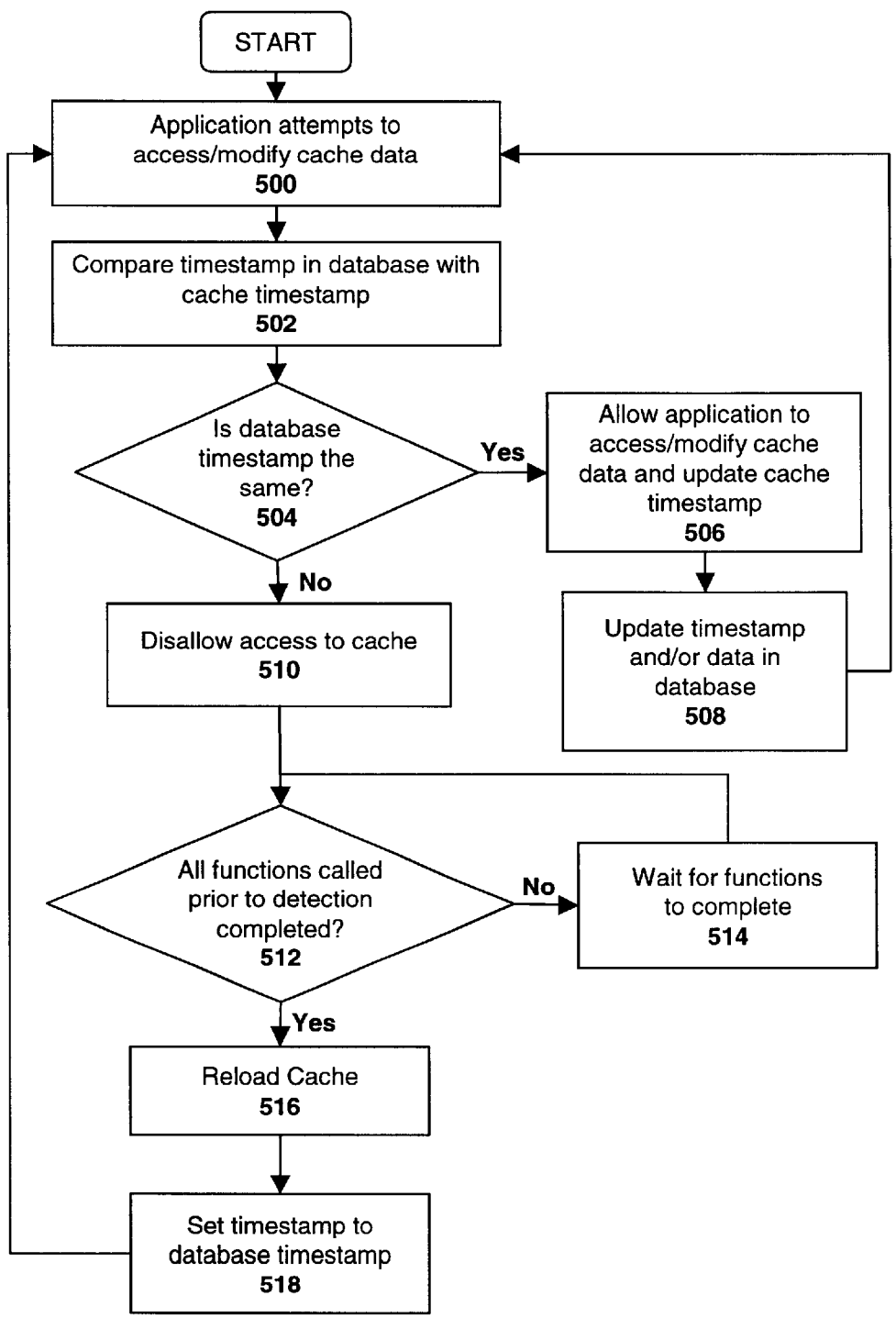
FIG. 5 illustrates a method implemented in accordance with one embodiment of the invention.

One embodiment of a method for synchronizing data across multiple virtual machines and/or applications is set forth in FIG. 5. At 500 an application attempts to access/modify data in its cache and as a result, at 502, the timestamp in the database is compared with the cache timestamp. If the two timestamps are equal (determined at 504), then the cache is not out of date and, at 506, the application is permitted to access/modify the data in the cache. At 508, the data and timestamp in the database is also updated to reflect the changes in the underlying data and the time that the changes were made.

Figure 6:
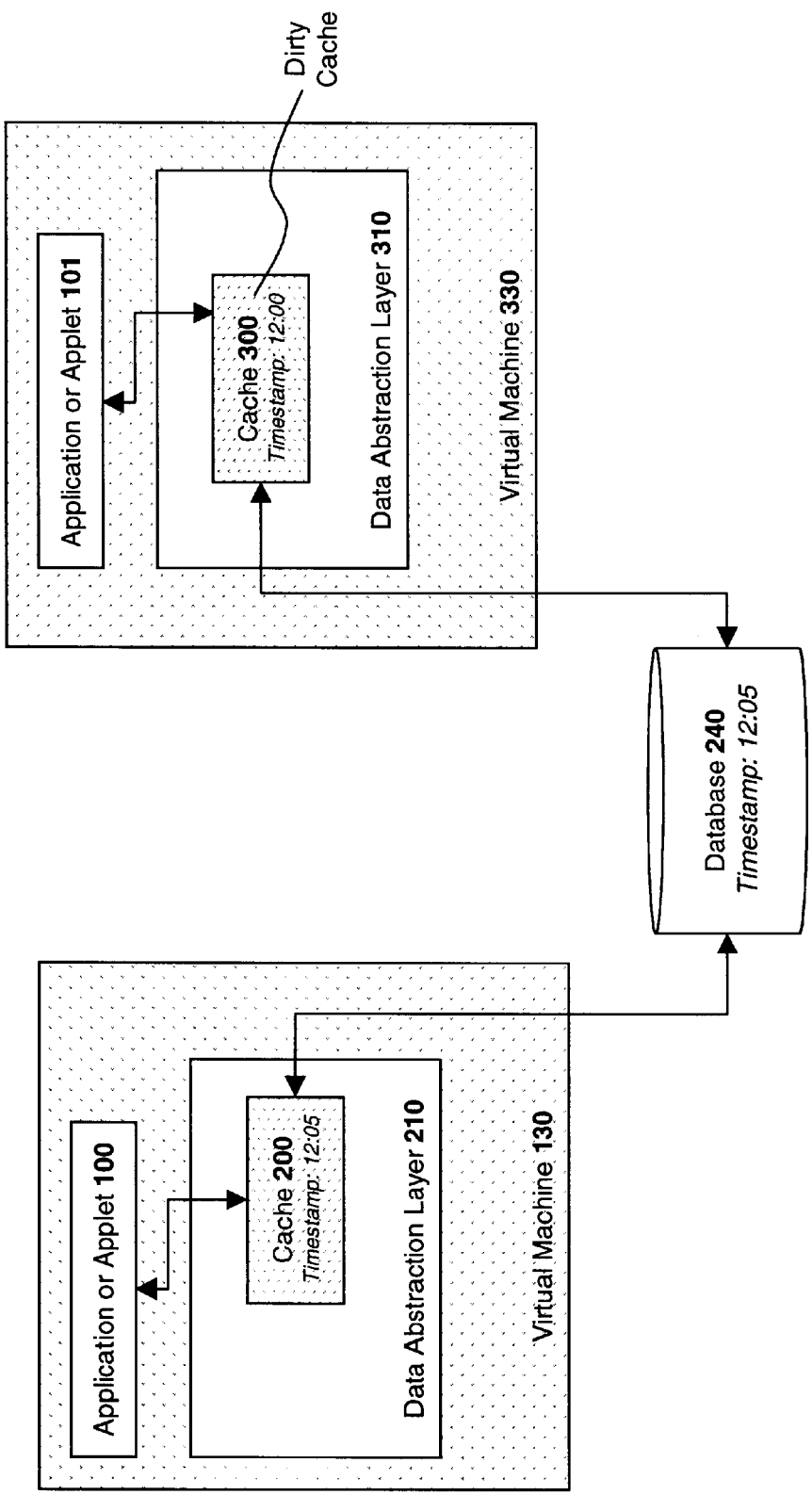
FIG. 6 illustrates cache synchronization using timestamps according to one embodiment of the invention.
Figure 7:
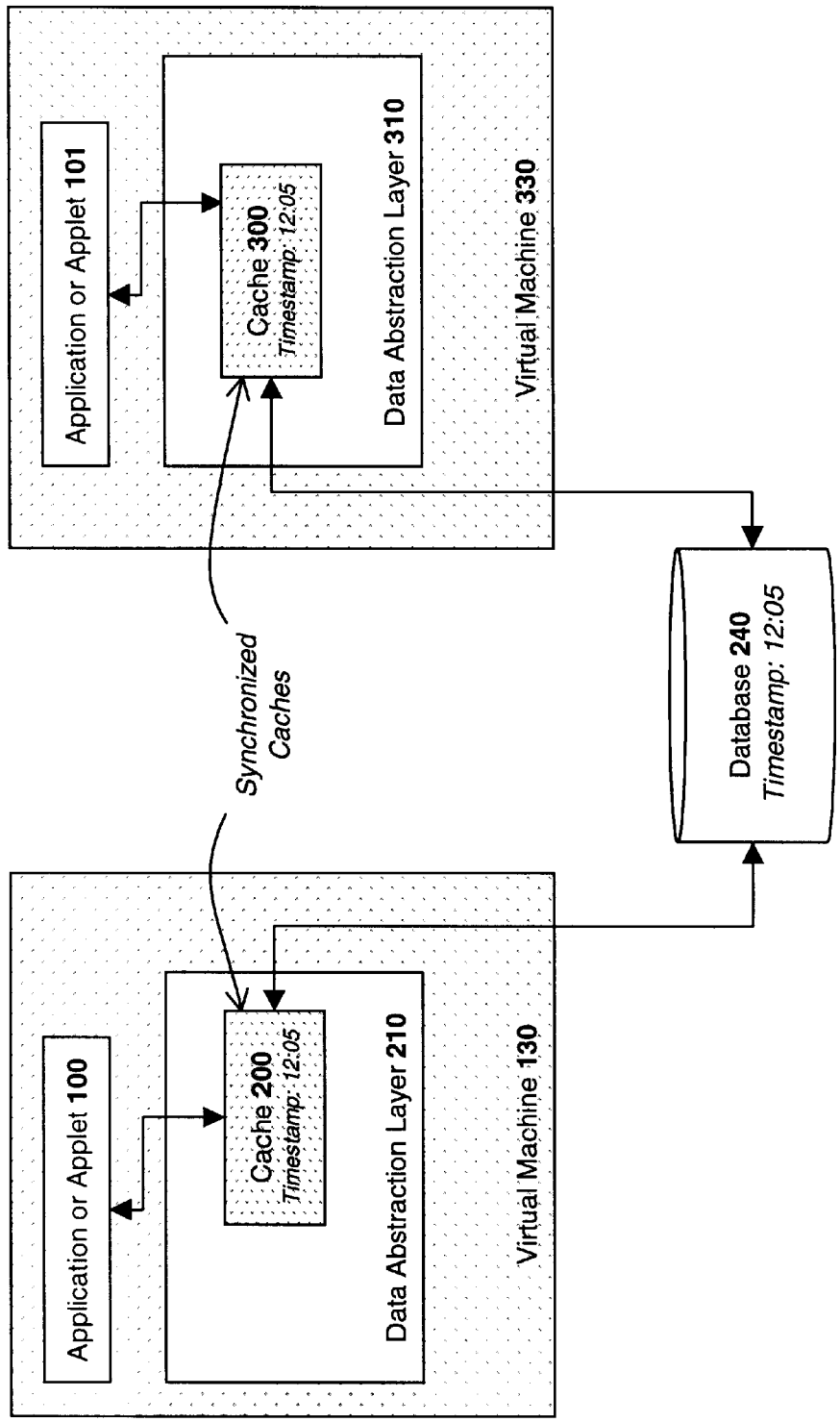
FIG. 7 illustrates cache synchronization using timestamps according to one embodiment of the invention.

If, however, the database timestamp and the cache timestamp are not equal, then the cache is out of date or "dirty" as indicated in FIG. 6, and must be reloaded (e.g., in FIG. 6 the timestamp of 12:00 is earlier than the database timestamp of 12:05). As a result, at 510, access to the cache is denied. At 512 it is determined whether all functions called prior to the dirty cache detection have completed. If not, then the method loops through 514 and 512 until all functions have completed. Once all functions have completed, at 516, the contents of the cache are dumped and the cache is reloaded. Finally, at 518 the timestamp is set to the same time as the timestamp in the database, resulting in synchronized caches as illustrated in FIG. 7.

Figure 8:
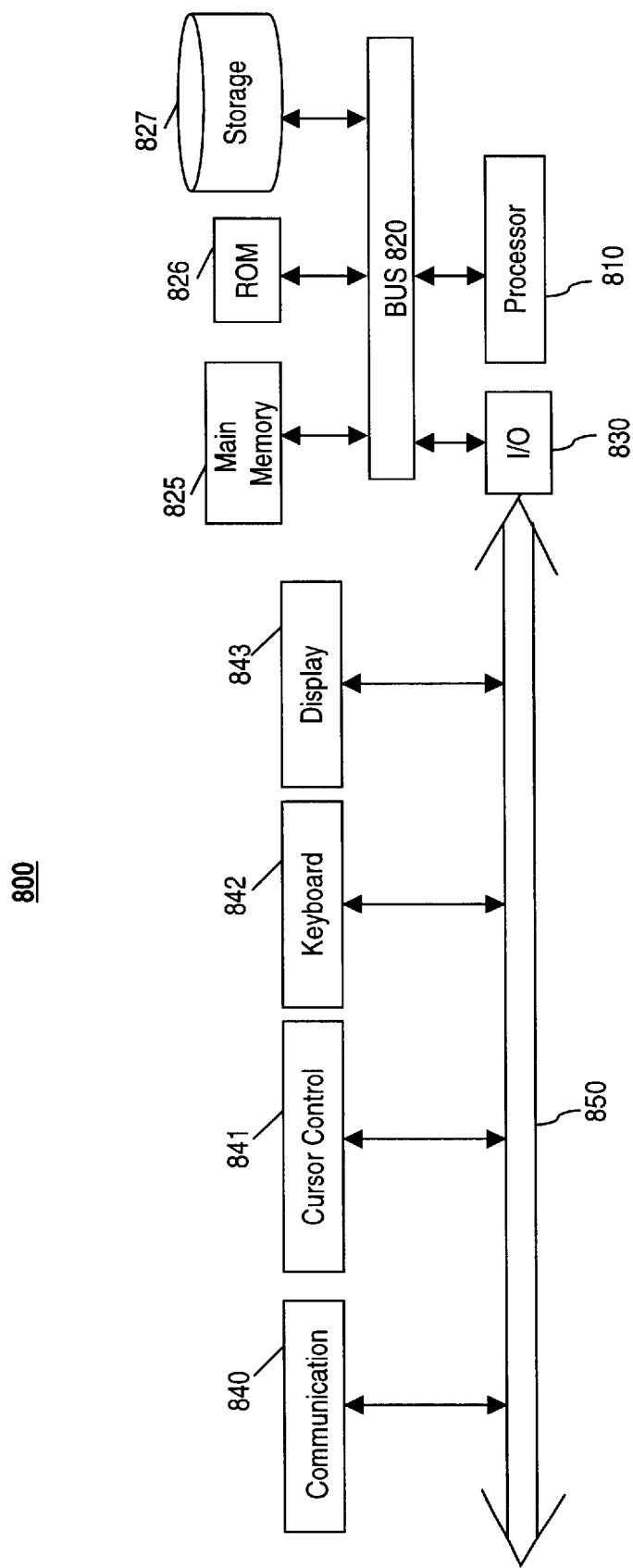
FIG. 8 illustrates an exemplary computer system on which embodiments of the invention may be implemented.

An exemplary computer system 800 representing clients and/or servers on which features of the invention may be performed will now be described with reference to FIG. 8. The computer system 800 comprises a system bus 820 for communicating information, and a processor 810 coupled to bus 820 for processing information. Computer system 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and/or other static storage device 826 coupled to bus 820 for storing static information and instructions used by processor 810.

A data storage device 827 such as a magnetic disk or optical disc and its corresponding drive may also be coupled to computer system 800 for storing information and instructions (e.g., Java applications/applets and virtual machine code). The computer system 800 can also be coupled to a second I/O bus 850 via an I/O interface 8230. A plurality of I/O devices may be coupled to I/O bus 850, including a display device 843, an input device (e.g., an alphanumeric input device 842 and/or a cursor control device 841).

The communication device 840 is used for accessing other computers (servers or clients) via a network, and uploading/downloading various types of data (e.g., Java applications/applets). The communication device 840 may comprise a modem, a network interface card, or other well known interface device, such as those used for coupling to Ethernet, token ring, or other types of networks.

Other embodiments of the invention may be implemented on cellular phones and pagers (e.g., in which the necessary transaction software is embedded in a microchip), handheld computing devices (e.g., personal digital assistants), and/or touch-tone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. For example, while the embodiments described above focus on a Java virtual machine implementation, it will be appreciated that elements of the invention may be implemented in virtually any data sharing environment (e.g., the invention may be implemented with non-Java interpreted code engines). In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for synchronizing data sharing across multiple instances of an interpreted code engine comprising:

comparing a data timestamp with a first cache timestamp responsive to an attempt to access a first cache;

allowing access to said first cache only if said data timestamp is equal to said first cache timestamp; and disallowing access to said first cache if said data timestamp is not equal to said first cache timestamp.

2. The method as in claim 1 further comprising:

updating said first cache timestamp and said data timestamp responsive to a modification of data in said first cache.

3. The method as in claim 1 further comprising:

waiting for one or more functions to complete before reloading said first cache, said one or more functions being called prior to detecting that said data timestamp is not equal to said first cache timestamp.

4. The method as in claim 3 wherein waiting for said one or more functions to complete comprises:

waiting for an access count variable to equal zero, said access count variable being incremented upon calling of each of said one or more functions and being decremented upon completion of said one or more functions.

5. The method as in claim 1 wherein said data is metadata describing data stored in a database.

6. The method as in claim 5 wherein said metadata comprises an index of data in said database.

7. The method as in claim 1 wherein said interpreted code engines are Java virtual machines.

8. The method as in claim 7 wherein said attempt to access said first cache is performed by a Java application.

9. The method as in claim 8 wherein said Java application is an applet.

10. The method as in claim 2 further comprising:

comparing said data timestamp with a second cache timestamp responsive to an attempt to access said second cache;

disallowing access to said second cache if said data timestamp is not equal to said second cache timestamp;

reloading said second cache with data associated with said data timestamp; and setting said second cache timestamp to equal said data timestamp.

11. A system comprising:

a data repository having a data timestamp associated therewith; and a first interpreted code engine having a first cache with a timestamp, said first interpreted code engine to compare said data timestamp with said first cache timestamp responsive to an attempt to access said first cache, allow access to said first cache only if said data timestamp is equal to said first cache timestamp, and disallow access to said first cache if said first cache timestamp is not equal to said data timestamp.

12. The system as in claim 11 wherein said first interpreted code engine is also to:

update said first cache timestamp and said data timestamp responsive to a modification of data in said first cache.

13. The system as in claim 11 further comprising:

a data abstraction layer to provide a communication interface between said first cache and said data repository.

14. The system as in claim 13 wherein said data abstraction layer further provides a communication interface between one or more applications and said first cache.

15. The system as in claim 11 further comprising:

a second interpreted code engine having a second cache with a timestamp, said second interpreted code engine to compare said data timestamp with said second cache timestamp responsive to an attempt to access said second cache, disallow access to said second cache if said second cache timestamp is not equal to said data timestamp, reload said first cache with data from said data repository, and set said second cache timestamp to equal said data timestamp.

16. The system as in claim 15 wherein said first and second interpreted code engines are Java virtual machines.

17. An article of manufacture including a sequence of instructions which, when executed by a processor, causes said processor to:

compare a data timestamp with a first cache timestamp responsive to an attempt to access a first cache;

allow access to said first cache only if said data timestamp is equal to said first cache timestamp; and disallow access to said first cache if said data timestamp is not equal to said first cache timestamp.

18. The article of manufacture as in claim 17 including additional instructions to cause said processor to:

update said first cache timestamp and said data timestamp responsive to a modification of data in said first cache.

19. The article of manufacture as in claim 17 including additional instructions to cause said processor to:

wait for one or more functions to complete before reloading said first cache, said one or more functions being called prior to detecting that said data timestamp is not equal to said first cache timestamp.

20. The article of manufacture as in claim 19 including additional instructions to cause said processor to:

wait for an access count variable to equal zero, said access count variable being incremented upon calling of each of said one or more functions and being decremented upon completion of said one or more functions.

21. The article of manufacture as in claim method as in claim 17 wherein said data is metadata describing data in said data repository.

22. The article of manufacture as in claim 21 wherein said metadata comprises an index of data in said data repository.

23. The article of manufacture as in claim 17 wherein said interpreted code engines are Java virtual machines.

24. The article of manufacture as in claim 23 wherein said attempt to access said first cache is performed by a Java application.

25. The article of manufacture as in claim 24 wherein said Java application is an applet.

26. The article of manufacture as in claim 18 including additional instructions to cause said processor to:

compare said data timestamp with a second cache timestamp responsive to an attempt to access said second cache;

disallow access to said second cache if said data timestamp is not equal to said second cache timestamp;

reload said second cache with data from said data repository; and set said second cache timestamp to equal said data timestamp.

27. The method as in claim 1 further comprising:

upon detecting that said data timestamp is not equal to said first cache timestamp, reloading said first cache with data associated with said data timestamp; and setting said first cache timestamp to equal said data timestamp.

28. The system as in claim 11 wherein, upon detecting that said timestamp of said first cache is not equal to said data timestamp, said first interpreted code engine reloads said first cache with data from said data repository and sets said first cache timestamp to equal said data timestamp.

29. The system as in claim 11 wherein said data repository is a database.

30. The article of manufacture as in claim 17 including additional instructions to cause said processor to:

reload said first cache with data associated with said data timestamp upon detecting that said data timestamp is not equal to said first cache timestamp; and set said first cache timestamp to equal said data timestamp.

31. A system comprising:

a processor;

a data repository accessible by a plurality of interpretive code engines; and a first of the plurality of interpretive code engines to convert between native instructions executable by the processor and processor-neutral code interpretable by a first application, the first interpretive code engine to maintain a cache to store a copy of data contained within the data repository, the first interpretive code engine to perform a lookup operation in the data repository to determine whether the data stored within the cache is current prior to allowing the first application to access the data in the cache.

32. The system as in claim 31 wherein the lookup operation comprises comparing a timestamp associated with the data in the cache with a timestamp associated with the data in the data repository.

33. The system as in claim 31 wherein the first interpretive code engine reloads the cache with data from the data repository upon determining that the data stored within the cache is not current.

34. A method comprising:

receiving a request by an application to access data within a cache at an interpreted code engine, the cache having a first timestamp associated therewith;

retrieving a second timestamp associated with data within a data repository;

comparing the first timestamp with the second timestamp prior to allowing access to the cache;

allowing access to the data within the cache only if the first timestamp matches the second timestamp; and disallowing access to the data within the cache if the first timestamp does not match the second timestamp.

35. The method as in claim 34 further comprising:

transmitting a copy of the data from the data repository to the cache; and setting the first timestamp equal to the second timestamp.

* * * * *

UNITED STATES PATENT AND TRADEMARK OFFICE
CERTIFICATE OF CORRECTION

PATENT NO. : 6,633,862 B2
DATED : October 14, 2003
INVENTOR(S) : Thompson

It is certified that error appears in the above-identified patent and that said Letters Patent is hereby corrected as shown below:

Column 3,
Line 8, insert the paragraph: -- The communication device 840 is used for accessing other computers (servers or clients) via a network, and uploading/downloading various types of data (e.g., Java applications/applets). The communication device 840 may comprise a modem, a network interface card, or other well known interface device, such as those used for coupling to Ethernet, token ring, or other types of networks. --

Signed and Sealed this

Twenty-seventh Day of July, 2004

JON W. DUDAS
*Acting Director of the United States Patent and Trademark Office*